June 3, 1930.  A. BLOCK  1,761,557
CASH REGISTER ATTACHMENT
Filed Nov. 3, 1920   8 Sheets-Sheet 2

INVENTOR.
ABRAHAM BLOCK
BY Chas. E. Townsend
ATTORNEY

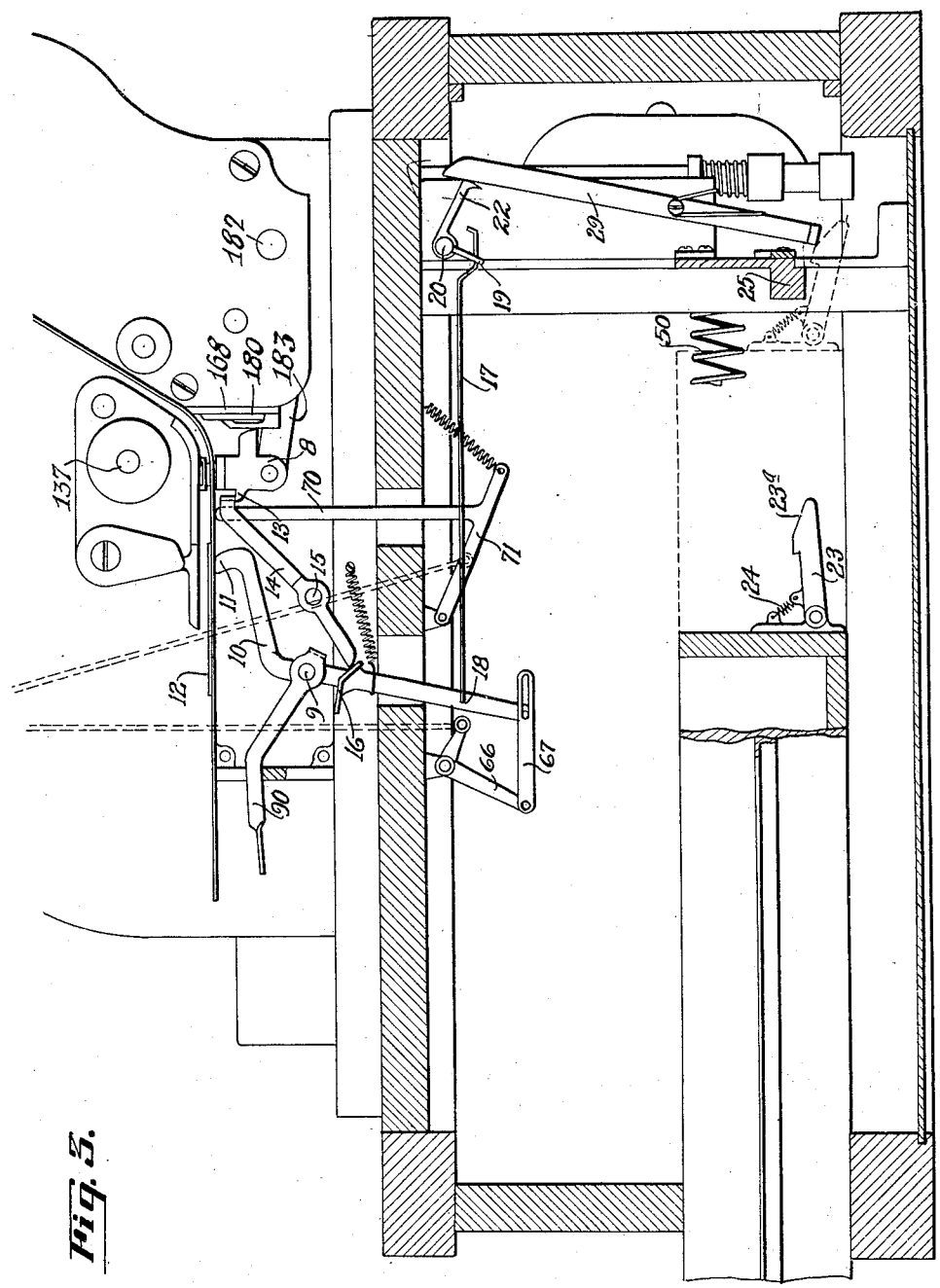

June 3, 1930.  A. BLOCK  1,761,557
CASH REGISTER ATTACHMENT
Filed Nov. 3, 1920  8 Sheets-Sheet 4
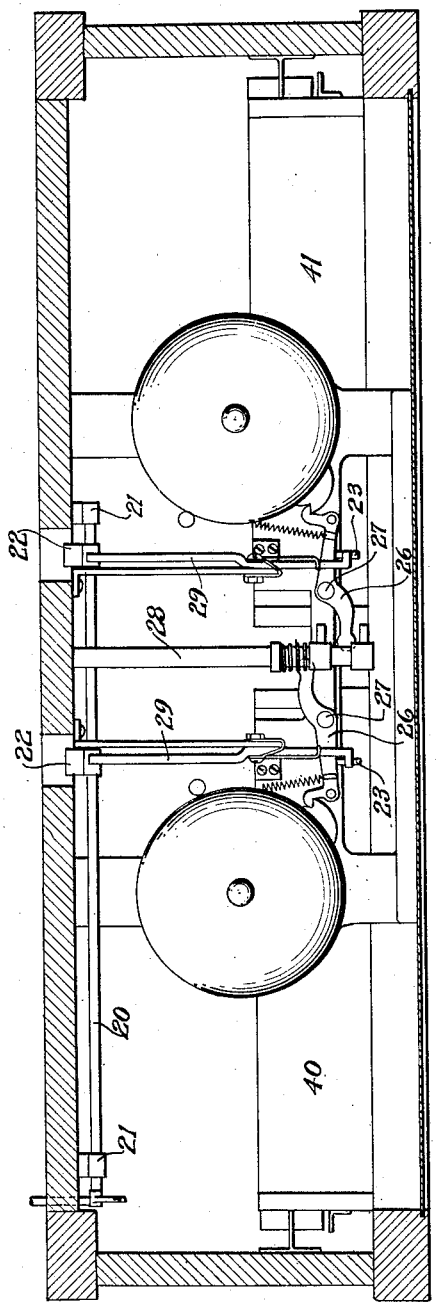
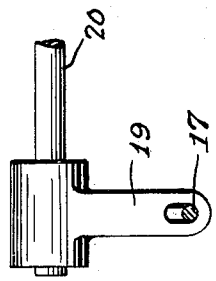
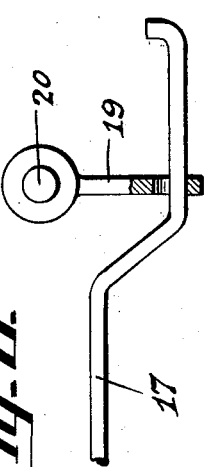
INVENTOR.
ABRAHAM BLOCK
BY *Chas. E. Townsend*
ATTORNEY

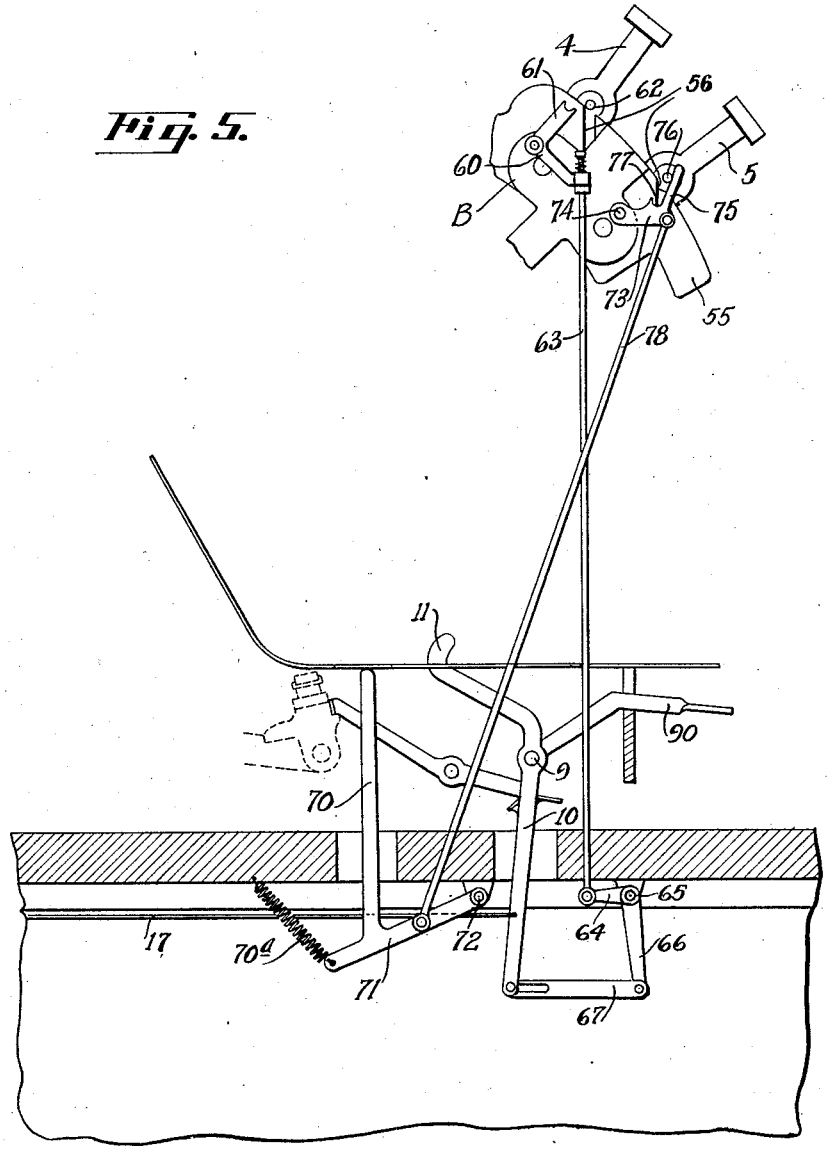

June 3, 1930.  A. BLOCK  1,761,557
CASH REGISTER ATTACHMENT
Filed Nov. 3, 1920  8 Sheets-Sheet 6
FIG. 8
FIG. 9
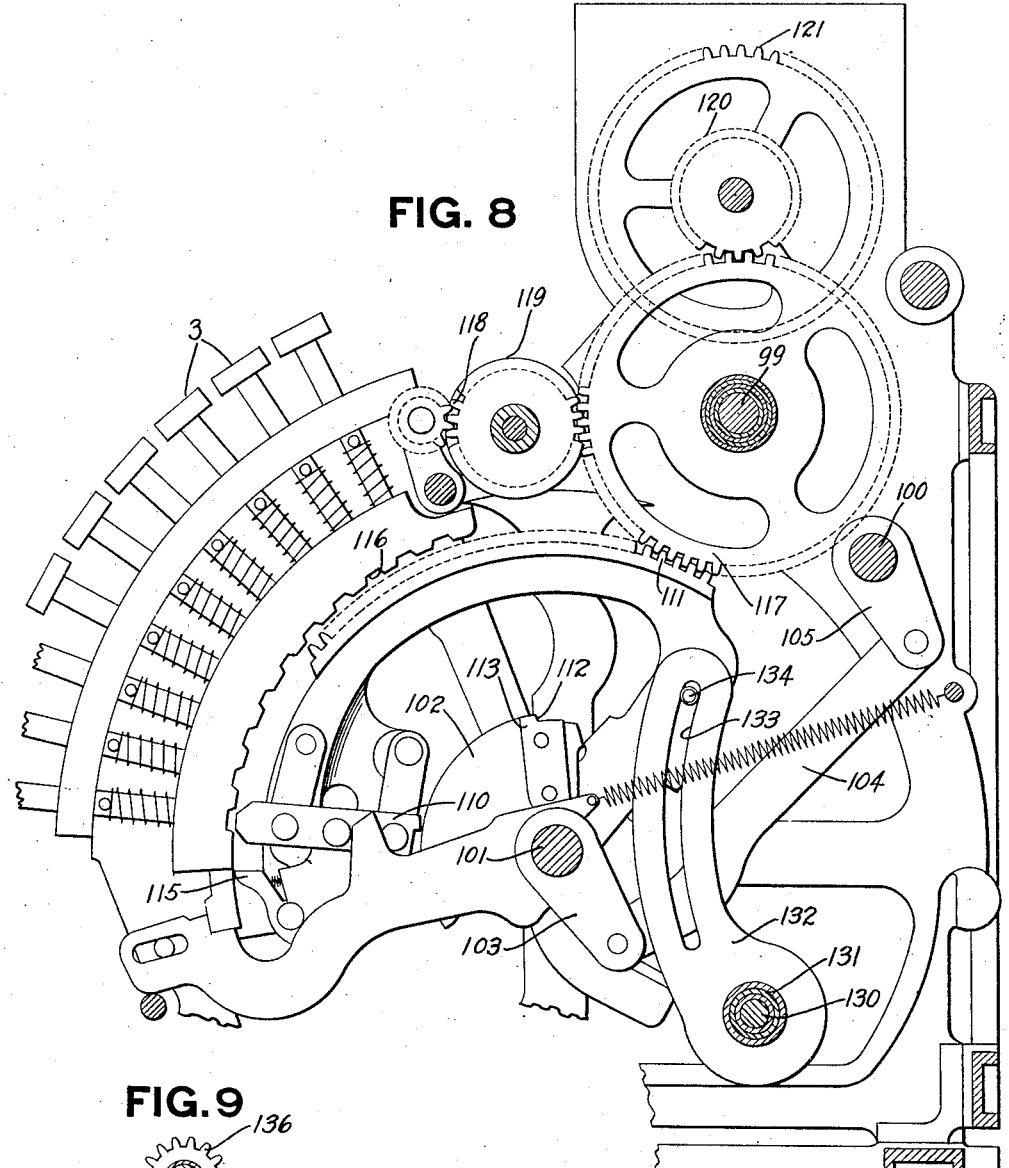
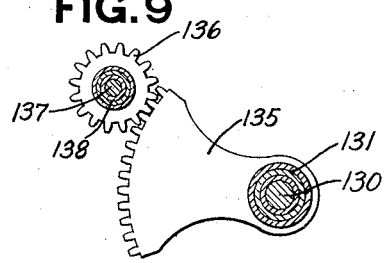
Inventor
Abraham Block
By
His Attorneys June 3, 1930.  A. BLOCK  1,761,557
CASH REGISTER ATTACHMENT
Filed Nov. 3, 1920  8 Sheets-Sheet 7
FIG. 10
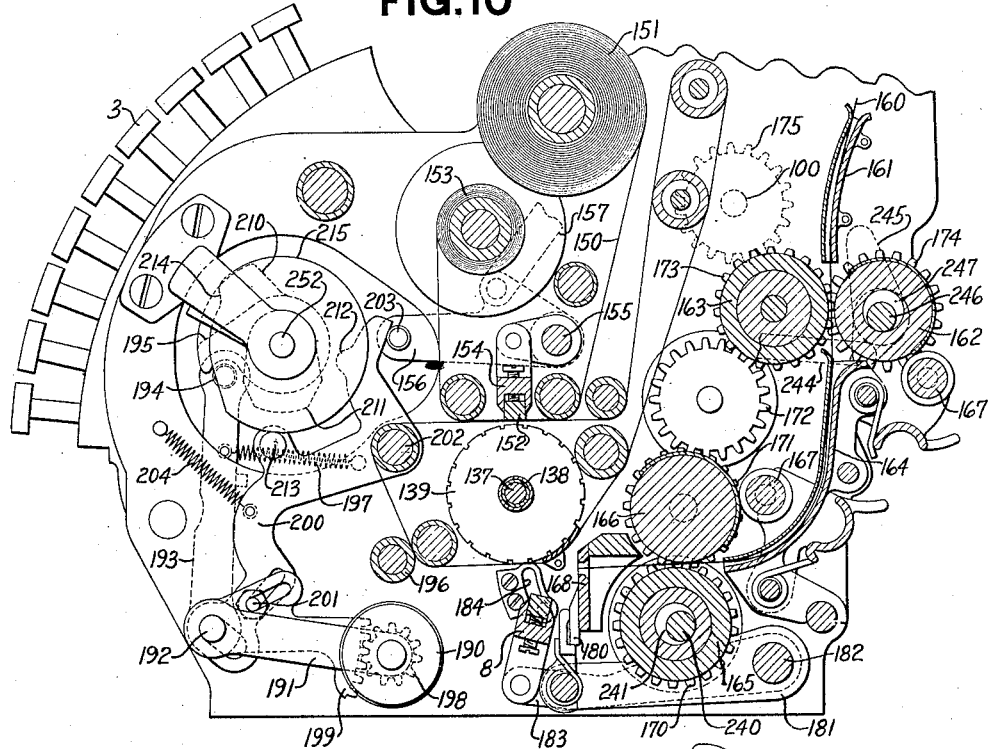
FIG. 11
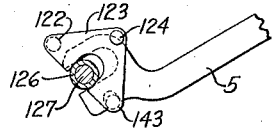
FIG. 12
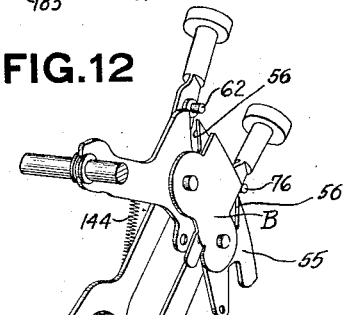
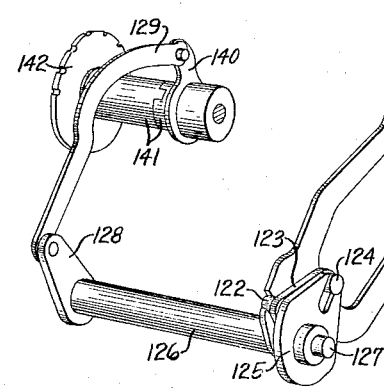
Inventor
Abraham Block
By Earl Beust
Henry E. Stauffer
His Attorney Patented June 3, 1930

1,761,557

UNITED STATES PATENT OFFICE

ABRAHAM BLOCK, OF SAN FRANCISCO, CALIFORNIA, ASSIGNOR, BY MESNE ASSIGNMENTS, TO THE NATIONAL CASH REGISTER COMPANY, OF DAYTON, OHIO, A CORPORATION OF MARYLAND

CASH-REGISTER ATTACHMENT

Application filed November 3, 1920. Serial No. 421,433.

This invention relates to a cash register, and especially to an attachment adapted to cooperate with the cash drawer and the receipts or sales slips printing mechanism.

There are many cash registers in use today which are provided with a printing attachment so operated that a receipt or sales slip will be issued whenever a sale or transaction is recorded in the cash register. These receipts, in the form of tickets, are automatically ejected by the printing mechanism and are delivered to a receptacle or shelf from which they are supposed to be removed one by one and handed to the respective customers as the sales or transactions take place.

There are many important reasons for issuing these receipts. There are several just as important reasons for insuring removal of the receipts from the shelf and delivery of the same to the respective customers. For instance, the issuing of a receipt or sales slip helps to enforce correct registration and manipulation of the cash register; they increase the sales-person's responsibility; they prevent forgetting to charge goods; they furnish direct advertising at less cost; they remove temptation when attempts toward theft or pilferage are considered; they serve as a receipt; they show if goods returned for exchange were bought in your store; further they must be removed from the shelf to prevent accumulation or damage to the printing mechanism, etc.

In actual practice it is found that the receipts are often left on the shelf and that this is largely due to carelessness and forgetfulness on the part of the salesperson. Again, it is found in some instances that the sales receipts are purposely left on the shelf, particularly when pilferage or theft is attempted.

One of the objects of the present invention is to insure removal of the sales receipts or tickets from the shelf and delivery of the same to the customer; further to accomplish this by providing means for reminding the salesperson of the fact that the ticket should be removed and delivered to the customer whenever the cash register is operated.

Another object, or one more specifically stated is to provide means which will prevent closing of the cash drawer when the sales receipts are not removed from the shelf, thus reminding the salesperson to remove the ticket at the time the money is placed in the cash drawer.

Another object of the invention is to prevent wrong manipulation of certain keys connected with the printing mechanism.

Further objects will hereinafter appear.

The invention consists of the parts and the construction, combination and arrangement of parts as hereinafter more fully described and claimed, having reference to the accompanying drawings, in which—

Fig. 3 is a similar view showing the cash drawer open, and locked against being closed.

Fig. 4 is a rear view showing the position of the cash drawer locking mechanism.

Fig. 5 is a detail view of two of the keys connected with the printing mechanism.

Figs. 6 and 7 are details showing the connection between the rod 17 and arm 19.

Figure 1:
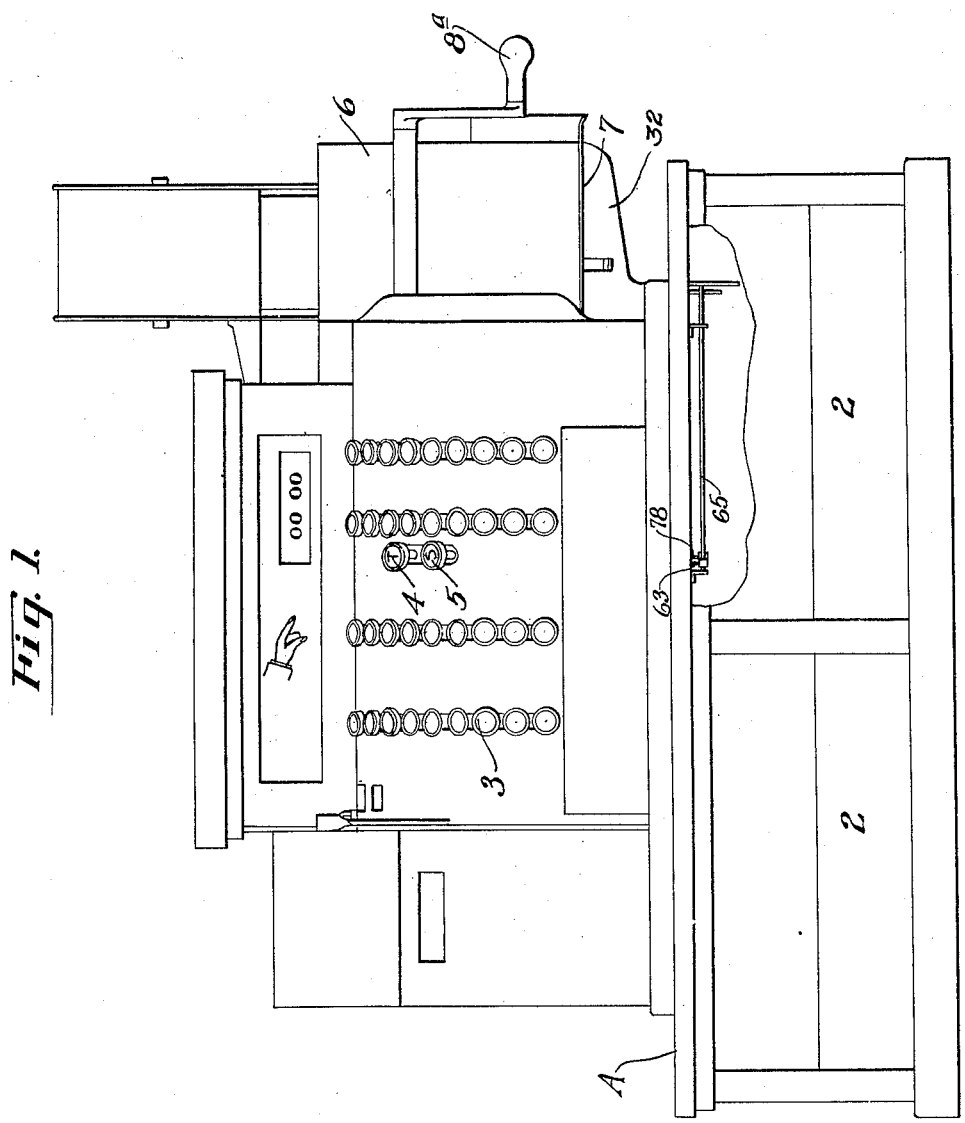
Fig. 1 is a front view of a cash register showing the application of the invention.

Fig. 8 is an enlarged vertical section showing the main operating mechanism of the machine illustrated in Fig. 1.

Fig. 9 is a detail showing the connection between the differential mechanism and the type wheels and tube line gears.

Fig. 10 is a section through the printing mechanism of the machine shown in Fig. 1.

Fig. 11 is a detail of the connection for the lower end of the "S" key.

Fig. 12 is a perspective view of the keys marked "T" and "S" and their cooperating mechanism for resetting a type wheel.

Figure 13:
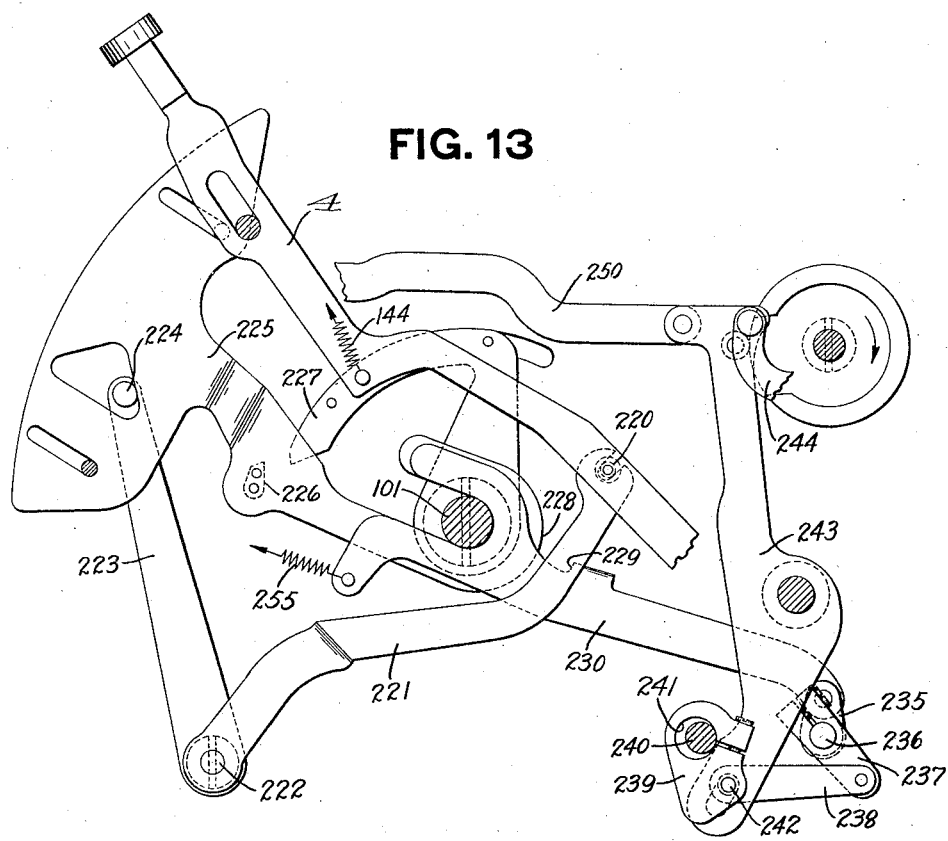

Fig. 13 is an enlarged detail showing the means for engaging the check electro rolls with their impression rolls.

Figure 14:
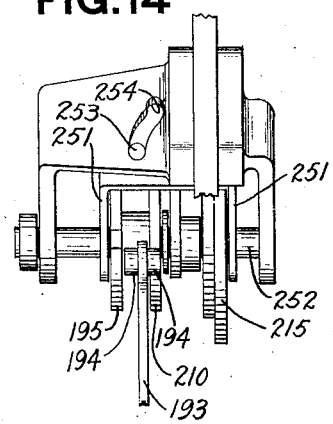

Fig. 14 is an edge view of the check and slip feed cams and means for shifting them.

Figure 15:
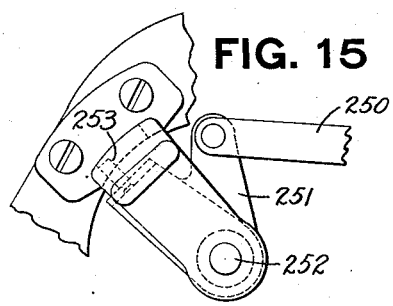

Fig. 15 shows the connection from the cam shifting mechanism to the "T" key.

Referring to the drawings in detail, A (Fig. 1), indicates the main frame or housing of the cash register, 2 the cash drawers employed, 3 the keys whereby the amount of the sale is recorded, 4 and 5 a pair of keys employed in conjunction with the printing mechanism, and 6 the housing enclosing the printing mechanism. Positioned directly below the printing mechanism is a receiving shelf 7 (Figs. 2 and 3), and positioned below said shelf is a movable platen 8. The shelf 7 is supported on an auxiliary plate 31 and a bracket 32 (Figs. 1 and 2) carried by the machine side frame (not shown). The plate 31 and bracket 32 are held in place by studs 33.

The present cash register here illustrated is constructed by The National Cash Register Company, and is known as the 900 type. This type of machine is shown in Letters Patent of the United States to E. J. Von Pein, No. 1,198,492, granted September 19, 1916. This cash register is mainly used in large department stores. One cash drawer is provided for each sales person and as only two are illustrated in the present instance, we will assume that two sales persons are supposed to use the cash register here shown. The majority of sales made in a department store are cash sales and whenever a sale is made and recorded in the cash register, a receipt or ticket is automatically ejected and delivered to the shelf 7. To more clearly describe the manipulation of the cash register when a cash sale is made and recorded, the following operations will be mentioned.

Certain of the keys 3 are depressed by the salesperson and the amount of the sale is recorded in the following manner. The crank 8ª is then turned and one of the cash drawers is automatically opened and the printing mechanism as above described is at the same time actuated. A short description of the adding, indicating and printing mechanism will be given here.

The crank 8ª (Fig. 1), through a train of gears, not shown herein, but which is fully described and illustrated in the Von Pein Patent No. 1,198,492, rotates shafts 99 and 100 (Fig. 10). The gearing above mentioned is so proportioned that for every complete rotation of the handle 8ª, the shafts 99 and 100 are given a complete rotation. A rock shaft 101 (Fig. 8), has secured thereto a plate 102 for each bank of keys. Also fast on shaft 101 is an arm 103 connected by a link 104 to an arm 105 fast on the shaft 100. Rotation of shaft 100 and the arm 105, this arm 105 being shorter than the arm 103, oscillates said arm 103 and the shaft 101 through an arc of about 90°, first anti-clockwise and then clockwise.

During the anti-clockwise movement, a latch or plunger 110, on a segment 111, engages a shoulder 112, on a plate 113, attached to plate 102. Through this connection, the segment 111 is carried upwardly during the clockwise movement of the plate 102 until a trip 115, connected to the latch 110, strikes the end of a depressed key 3 and causes the latch 110 to be disengaged from the shoulder 112, and its front end engages one of the notches 116 corresponding to the key depressed, thus holding the segment 111 in its moved position.

This segment 111 is, at all times, in mesh with an intermediate gear 117, which meshes with gear 118 for a totalizer 119. Gear 117 also meshes with a pinion 120 rigid with an indicator 121. Through this series of connections the differential movement of segment 111 is transmitted to the totalizer and the indicating devices so as to add and indicate the value represented by the key depressed.

Extending across the machine is a shaft 130 and a series of nested sleeves 131. This shaft and each of the sleeves, has secured thereto, an arm 132 having a slot 133 engaging a stud 134 on segment 111. Thus any movement of the segment 111 is transmitted to either the shaft 130 or the proper sleeve 131. At their right ends, the shaft and sleeves, each carry a segment 135 (Fig. 9), each of which meshes with a pinion 136 attached to a shaft 137 and nested sleeves 138, to the other ends of which are attached the value printing wheels 139 (Fig. 10). Movement of a segment 111 will, through the mechanism just described, rotate the corresponding type wheel 139, to bring, to printing position, a figure or character to represent the key depressed in that particular bank or section of the machine.

The keys 4 and 5 (Figs. 1, 5 and 12) control a special type carrier to print designating characters, and, in this particular instance, the characters "T" and "D". The key 4 (Fig. 12) has a slot cooperating with a pin 122 on a plate 123, which carries another pin 124 cooperating with a plate 125 fast on a sleeve 126 on a shaft 127. Sleeve 126 has an arm 128 connected by a link 129 to an arm 140 connected by sleeves 141 to a type wheel 142. Depression of key 4, rotates the type wheel 142 counter-clockwise to set a character corresponding to this key.

The key 5 cooperates with a pin 143 (Fig. 11) on plate 123, this pin being below the shaft 127. Consequently, depression of the key 5 causes the plate 125, and its connections, to rotate clockwise, thus turning the type wheel 142 clockwise to set up a character corresponding to the key 5. The keys 4 and 5 are returned to their normal positions by springs 144.

The printing mechanism includes detail printing, check printing, and slip printing. These mechanisms will be briefly described in the order mentioned. A detail strip 150 is fed from a supply roll 151, underneath a platen 152, and wound upon a receiving roll 153. A platen frame 154 is supported by arms on a shaft 155 to which is secured a bell crank 156 having pivoted thereto a pitman 157 which is operated by a cam (not shown) on the shaft 99. This cam and the pitman 157 cause the platen 152 to strike the upper side of the type wheels 139 to print on the detail strip.

The check issuing mechanism will now be described. The check paper 160 (Fig. 10) is fed through a guide 161 between an eccentrically mounted electroroller 162 and an impression roller 163, then through a guide 164 and between an eccentrically mounted electroroller 165 and an impression roller 166. Ink rollers 167 are provided for the electrorollers. After the check passes between the rollers 165 and 166, it passes through an opening in a frame 168, then underneath the type wheels 139. The electrorollers are normally separated from their respective impression rolls, so as to afford an easy manner of inserting the check paper into the machine. The electrorollers are moved, by means to be hereinafter described, into contact with the impression rolls to feed the check paper.

These rolls are turned by a train of gears 170, 171, 172, 173 and 174 which are driven by a gear 175 upon a drive shaft 100. At the proper time a knife 180 is moved upwardly by a pair of arms 181, on a shaft 182, and operated by a cam (not shown), so as to cut off the check. The platen 8 is supported by a pair of arms 183 on the shaft 182 and operated by a cam (not shown). Normally the platen 8 stands at an angle (Figs. 2 and 10), but as the arms 183 rise, the platen is guided by a cam block 184, so that as it approaches the type wheels 139, it will be parallel (Fig. 3) to the type presented at the printing line.

The check ejecting mechanism consists of a roller 190 (Fig. 10) on an arm 191 fast on a shaft 192. Also fast on this shaft is an arm 193 having a pin 194 projecting from both sides thereof, one side of which is not in alignment with the cam 195 but which is adapted to be moved into alignment therewith. Near the end of the rotation of the cam it rocks the arm 193 counter-clockwise, which raises the roller 190 into contact with a roller 196 on a stationary shaft.

As the cam 195 moves to its home position, spring 197, attached to the arm 193, withdraws the ejector roll 190 from contact with the roll 196.

The roller 190 is turned, so as to feed the check from a position underneath the type wheels, so that it overlies the finger 11. This is accomplished as follows: Secured to the roller 190 is a pinion 198 meshing with a segment 199, loose on the shaft 192, and connected with a lever 200 by a pin-and-slot connection indicated at 201. This lever is pivoted at 202, and its upper end cooperates with a pin 203 on the previously described bell crank 156. The lever 200 is held in its normal position by a spring 204. Before the roller 190 contacts with the roller 196, the bell crank 156 is rocked counter-clockwise, thus permitting the spring 204 to rock the lever 200 clockwise, which raises the segment 199 and rotates the roller 190 clockwise.

The roller 190 is then engaged with the roller 196, as previously mentioned; that is, there is a check between the two rollers 190 and 196, and before the cam 195 permits the roller to be lowered, the bell crank 156 is restored to its normal position, whereby its pin 203 rocks the lever 200 counter-clockwise, thus rotating the roll 190 counter-clockwise, and feeding the ticket from the printing position, so that it overlies the finger 11.

When a slip is to be printed upon, it receives two impressions and is advanced between those impressions by the roller 190 (Fig. 10). During this operation, the pin 194 cooperates with a cam 210 which raises and lowers the roller in a manner similar to the cam 195, except that it raises it at a different time. The lever 200 causes the roller 190 to be rotated clockwise before it is raised to engage the slip, and after being in engagement therewith, a cam 211 strikes a projection 212 on the lever 200, and causes a roller 213 on the lever 200 to be moved into the depression 214 of a cam 215. This cam is rotated with the cam 210. Near the end of the rotation of the cam 215, the roller 213 is moved downwardly, thus rocking the lever 200 which causes the roller 190 to be rotated to feed the slip into position to receive the second impression, after which the cam 210 permits the arm 193 to be moved to its normal position to lower the roller 190 to the position shown in Fig. 10.

The means for causing the electrorollers to engage their impression rollers upon depression of the "T" key is as follows: Engaging a stud 220 (Fig. 13) on the key 4 is an arm 221 fast on a shaft 222, which also has fastened thereto an arm 223 having a pin 224 entered in an opening in a plate 225. This plate carries a lug 226 adapted to cooperate with a cam arm 227 fast on the shaft 101. Depression of the key 4 rocks the arms 221 and 223 clockwise, which moves the lug 226 in the path of movement of the cam arm 227. Counter-clockwise movement of the cam arm 227 moves the plate 225 still farther, whereby its inner end 228 engages lug 229 on a spring drawn pitman 230. This pitman 230 is connected to an arm 235 fast on a shaft 236, which also has fast thereon an arm 237 connected by a link 238 to an arm 239 fastened to the shaft 240 which carries an eccentric 241 upon which the electroroller 165 is mounted. Movement of the pitman 230 rotates the eccentric 241 whereby the electroroller 165 is caused to engage the impression roller 166. The arm 239 has a pin 242 engaging a slot in a lever 243, to the upper end of which is pivoted a link 244 (Figs. 10 and 13), connected to an arm 245 on a shaft 246, carrying an eccentric 247, upon which the electroroller 162 is mounted. The movement of the arm 239 is communicated through the lever 243 to the link 244, thus causing the eccentric 247 to move the electroroller 162 into engagement with its impression roller 163.

The mechanism for shifting the cams 195 and 210 (Figs. 14 and 15), upon depression of the "T" key, will now be described. Connected to the lever 243 is a link 250 which is connected to a yoke 251 fast on the shaft 252 which carries said cams. The yoke 251 has a pin 253 extending into a cam slot 254 in the frame of the machine. In Fig. 14 the pin 194 is shown in the same plane as the slip feeding cam 210. This is the normal position. When the "T" or check key is depressed, and the lever 243 rocked clockwise, as previously stated, the link 250 rocks the yoke 251 clockwise (Fig. 15), and the pin 253 causes the yoke 251 and the cams 210 and 195, and the shaft 252, to be shifted to the right (Fig. 14), whereby the cam 210 is moved out of the path of movement of the pin 194, and the cam 195 is moved into the path of the pin 194, so that the roll 190 will be operated to eject the check in a manner previously described. These parts are all returned to their normal positions by a spring 255 connected to the pitman 230.

This printing mechanism prints a receipt or ticket which is ejected and delivered to the receiving shelf 7. If change is required it is obvious that this is removed from the drawer and that the receipt together with the change is handed to the customer. Removal of the receipt from the shelf permits locking of the cash drawer in its closed position, but failure to remove the receipt from the shelf 7 will prevent closing of the cash drawer. The natural tendency for a salesperson is to close and latch the cash drawer after the moment money has been placed therein and the change, if any, removed. Any attempt to latch the drawer in the closed position however, if the printed receipt remains on the shelf is prevented in this instance as will later be described and thus serves the purpose of reminding the salesperson that the receipt has not been removed and delivered to the customer. In other words a salesperson cannot very readily excuse such neglect by saying, that "I forgot;" "I am sorry," etc., as it will be impossible for the salesperson to latch the cash drawer in said closed position unless the ticket is removed. This locking of the cash drawer in open position if the ticket is left remaining on the receiving shelf 7 is accomplished in the following manner:

Pivotally mounted as at 9 (Figs. 2, 3 and 5), on the auxiliary plate 31 below the receiving shelf 7, is a feeler lever 10. The lever 10 is mounted on the outside of the auxiliary plate 31 and beneath the shelf or table 7, which table extends over the auxiliary plate 31. The upper end of this feeler lever is provided with a feeler finger 11, which projects through a slot formed in the receiving shelf 7. The lever, together with the finger 11, normally assumes the position shown in Fig. 2, but it is rocked or depressed so as to assume the position shown in Fig. 3 whenever the printing mechanism is actuated, so as to permit the ticket indicated at 12 to be ejected and delivered to the point indicated in Fig. 3. This is accomplished in the following manner: 8 indicates the platen by which the printing is accomplished. This platen swings in a forward and upward direction when printing, and it is provided with a lug 13 on its forward face near the right-hand end thereof when looking from the front of the machine. The lug 13, however, does not extend across the entire face of the platen, it being only wide enough to cooperate with a feeler operating lever 14 pivotally mounted as at 15 on the auxiliary plate 31. The forward end of the lever 14 engages a cam 16 formed on the feeler lever 10 just below the pivotal or fulcrum point 9. In other words when the platen is swung forwardly and upwardly, lever 14 swings about its pivot 15 in the direction of arrow a (Fig. 2), and as the feeler operating lever 14 contacts the cam 16, the feeler lever 10 is swung about its fulcrum point 9 in the direction of arrow b; thus depressing the feeler finger 11 and permitting the ticket 12 to become ejected and to assume the position shown in Fig. 3. A comparatively narrow space is formed between the bottom of the printing mechanism and the top of the receiving shelf 7 and as the ticket 12 assumes the position shown, it will hold the feeler lever 10 and the feeler finger 11 in a depressed position. Such depression of the finger 11 or rocking movement of the lever 10 exerts a forward pull on a link 17 attached to the lower end of the lever 10 as at 18. This link is connected with a crank arm 19 secured on a shaft 20. This shaft extends across the rear end of the cash register (Figs. 2, 3 and 4), being pivotally supported in journal blocks 21. Secured on the shaft is a pair of latches 22. These latches normally assume the raised dotted line position shown in Fig. 2, but they are lowered and will assume the position shown in Fig. 3 when the feeler finger 11 is depressed. The connection between the link 17 and the arm 19 permits relative movement between the link and arm when the finger 11 is lowered to permit the insertion of a delivery bill or ticket specifically hereinafter referred to. As the finger 11 is lowered while the machine is at rest the latch member 22 is lowered against the end of a lever 29, later described. The loose or slip connection permits between the link 17 and arm 19 the lever 29 to be moved rearwardly to permit the parts to assume the positions shown in Fig. 3 during the subsequent operation of the machine.

Figure 2:
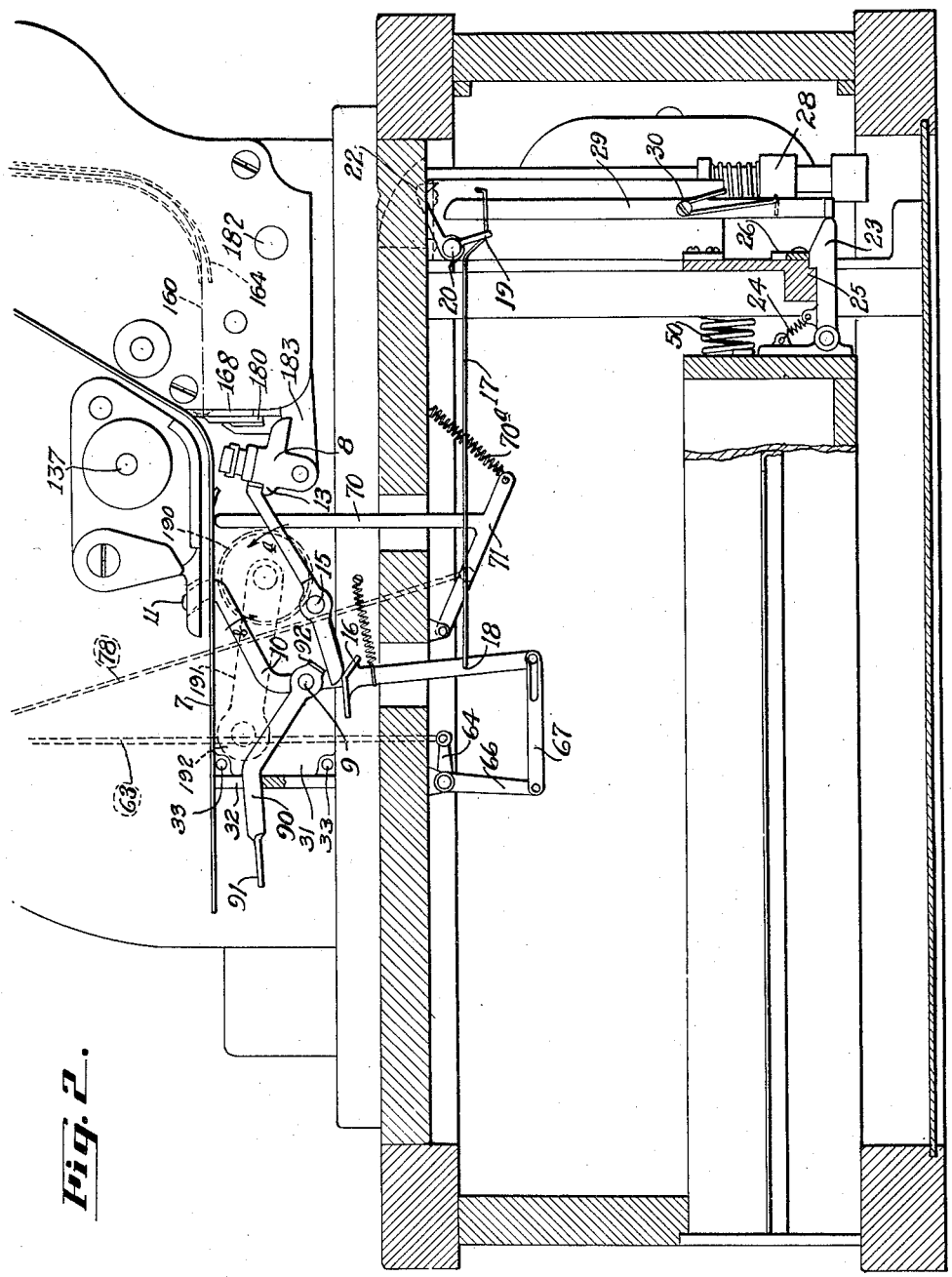
Fig. 2 is an enlarged end view, in section, showing the location of the attachment and the connections formed between the same with relation to the printing mechanism and the cash drawer.

In Figs. 2 and 3 only one cash drawer is shown. Pivotally attached to the rear end of the cash drawer is a drawer latch 23, which is normally held in a raised position by a spring 24. This latch is adapted to engage a notched plate 25 when the drawer is closed, and it is disengaged from said notched plate when the drawer is opened, by means of a lever 26 (Fig. 4) pivotally mounted as at 27 on the rear side of the cash register frame. This lever is actuated by a rod 28 and this rod is in turn actuated by the crank 8$^a$ in a well known manner, whenever a sale is recorded.

By referring to Figs. 2, 3 and 4, it will be seen that a vertically disposed drawer latch-disabling lever 29 is arranged in alignment with the drawer latch 23 and that the lever is pivotally supported with relation to the cash register frame at a point indicated at 30. The lever assumes the position shown in Fig. 2 when the cash drawer is closed and it assumes the tilted position shown in Fig. 3 when the drawer is open.

From the previous description submitted, it will be remembered that depression of the feeler finger 11, caused by rocking movement of the feeler lever 10 about its fulcrum point 9, will cause the link 17 to release the crank arm 19 which will swing until the latch 22 rests on top of the lever 29. When the lever 29 is rocked clockwise, as above described, it swings past the latch 22, due to the curved upper end of said lever, thus permitting the latch 22 to be lowered by gravity to the position shown in Fig. 3. The loose connection between the rod 17 and arm 19 (Figs. 5, 6 and 7) permits this movement of the lever 29 and latch 22. When in its lower position the latch 22 will engage the forward face of the drawer latch-disabling lever 29 when this lever assumes the tilted position shown, and it will retain this lever 29 in the angular position shown as long as the lowered position is assumed. In other words lever 29 cannot assume a vertical position as long as the latch 22 is lowered, and again it may be stated that latch 22 cannot assume a raised position until the ticket 12 is removed and the feeler finger 11 is permitted to assume its raised or normal position shown in Fig. 2, and as this position can only be assumed when the ticket is removed, it is obvious that removal of the ticket will be required before the lever 29 can be returned to normal position. The angular position assumed by the lever 29 affects the cash drawer latch 23, that is, the lower end of the lever 29 which is in alignment with the latch 23 engages a cam face 23$^a$ formed thereon, and it depresses the latch to such an extent that it cannot engage the locking plate 25. Therefore, if any attempt is made towards closing and locking the drawer when a ticket remains on the shelf, it is obvious that the drawer latch-disabling lever 29 will assume the angular position shown and that such position will prevent engagement of the drawer latch 23 with the notched locking plate 25. Removal of the ticket will however permit the several parts to assume normal positions and when these positions are assumed, lever 29 will assume a vertical position and will thus permit the latch 23 to engage the locking plate 25 and maintain the cash drawer closed when it is moved inwardly to closed position.

In Fig. 4, the rear ends of the two drawers are shown at 40 and 41. The shaft 28 actuates two levers such as indicated at 26 and the shaft 20 actuates two latches 22, together with two cooperating drawer latch-disabling levers 29. In other words the mechanism actuating two separate drawers is controlled by the single feeler lever 10 on which is mounted the feeler finger 11. It should furthermore be obvious that any number of drawers may be actuated from the same common source.

From the foregoing description it must be seen that the locking of a cash drawer in its closed position cannot be accomplished unless the sales receipt or ticket 12 is removed. Any attempt to so lock the drawer will be foiled as it will be returned to open position by the springs 50 whenever an attempt is made to lock the same. The salesperson finding that the drawer cannot be latched in its closed position is instantly reminded that to latch the same it is necessary to remove the sales receipt or ticket 12, and when thus reminded there can be no excuse for not delivering the receipt or ticket to the customer who has made a purchase.

The majority of sales recorded on a cash register of the character described are cash take sales. These sales are automatically taken care of by the printing mechanism as a ticket or receipt is ejected whenever a cash take sale is recorded. In fact the issuance of a ticket shows that a cash take sale has been made and it is furthermore marked as such by the printing mechanism. The key generally indicated at 4 (Figs. 1 and 12) is depressed whenever a cash take sale is recorded and the initial "T", representing the word "take", is stamped upon the ticket in the manner previously described. It sometimes happens that certain customers buying goods request that the same be delivered. Such sales are taken care of by a separate sales slip which is filled out by the salesperson and then inserted in the printing mechanism. Whenever such a sale is recorded the second key indicated at 5 (Figs. 1 and 12) is depressed; this key being connected with the printing mechanism actuates the same as previously described to the extent that the initial "D", representing the word "delivery", is printed on the sales slip. In most stores salespersons only have these two separate transactions, that is either a cash take sale or a cash delivery sale. In each instance one or another of the keys 4 or 5 (Figs. 1, 5 and 12) should be manipulated to show the character of the sale. It is sometimes found that the wrong key is depressed and that correction is required. Such correction is generally taken care of by calling an authorized person who checks the error and corrects the same. One of the objects of the present invention is to prevent such error by providing means which will prevent depression of the delivery recording key 5 when a cash take sale is recorded, and conversely will prevent depression of the cash take recording key 4 when a delivery sale is recorded. This mechanism cooperates with the feeler lever 10 and functions as follows:

Pivotally mounted on a frame B, (Fig. 5) supporting the keys 4 and 5, is a crank arm 60. One end of this arm is notched as at 61 and is adapted under certain conditions to engage a pin 62 secured on the key 4. Attached to the opposite end of the crank arm is a link 63, the lower end of which is secured to a crank arm 64 secured on a shaft 65. The link 63 is slidably connected to the crank arm 60 and a spring located between the crank arm and a head on the link prevents a binding action between the crank arm and the pin on the key 4 when the finger 11 is depressed and when the key 4 is returned to normal. This shaft 65 runs parallel with the front of the machine and is extended to a point adjacent the feeler lever 10. It is connected with said feeler lever 10 by a second crank arm 66 and a slotted link 67. If a cash take sale is recorded, it is first accomplished, as previously stated, by depressing certain of the keys 3, or in other words, a sufficient number of keys to record the amount of the sale and then by depressing the cash take key 4. This key cannot be depressed if a ticket remains in the machine as the feeler finger 11 will be depressed and will, through means of the lever 10, impart a rocking movement to the shaft 65 which will pull the link 63 in a downward direction and swing the notched end of the crank arm 60 into alignment with the pin 62. In other words two cash take sales cannot be recorded successively if the ticket is left remaining in the machine, nor can the cash take sale recording key 4 be depressed if a delivery bill or ticket is inserted in the machine as the finger 11 will be depressed. The key 5 recording delivery sales is somewhat similarly controlled, but it is different to this extent that it is controlled by a separate feeler or a depressible finger indicated at 70. This finger forms a part of a lever 71, pivotally attached as at 72 to the lower part of the cash register frame. This lever 71 is connected with a second lever 73 pivotally attached on the frame B, as at 74. This lever 73 is provided with a finger 75 contacting a pin 76 on the key 5, and it is further provided with a notch 77, the function of which will hereinafter be described. The lever 73 is connected with the lever 71 by a link or rod 78. Its function is as follows:

If a delivery cash sale is to be recorded, it is first necessary for the salesperson to fill out a delivery bill and then to place it on the shelf 7 and to push it rearwardly in under the printing mechanism so that the platen 8 may print thereon. Insertion of the delivery bill is permitted when lever 90 is manually lifted and finger 11 thereby depressed as hereinafter more fully described. The inserted bill will hold the finger 11 depressed. When a delivery sale is recorded amount keys are first depressed, and then the key 5 is depressed. Depression of the key 5 is permitted as the bill by holding the finger 70 depressed prevents movement of the notch 77 of the lever 73 into the path of the pin 76 on the key 5. In other words, if the finger 70 is held in the position shown in Fig. 5, depression of the key 5 will be permitted as the pin 76 will pass beyond the notch 77 and will not be engaged or stopped thereby. If no sales bill is inserted, finger 70 will rise upon depression of key 5, due to the pull of a spring 70ª. Finger 75 will follow the pin 76 and said pin will finally enter the notch 77 and the key will thus be locked against complete depression. In other words, key 5 or the key which records delivery sales, can only be depressed when the sales bill or ticket is inserted, and it cannot be depressed when no ticket is in the machine, nor when a cash take ticket is in the machine, as the cash take ticket when printed and ejected in the manner previously described assumes a position in advance of the finger 70 where it will not stop said finger from assuming a raised position when the key 5 is depressed.

It will be noted that the shelf 7 is turned upwardly at the rear end so that when the slip is placed upon the shelf, the end of the slip extending into the machine is guided in a path above the knife 180 to prevent the knife from severing the slip on the subsequent operation of the machine. By referring to Fig. 2 it will be seen that the check chute 164 is mounted to the rear of the upturned end of the shelf 7 and the check paper is guided through an opening in the frame 168 above the knife blade 180. The check paper then passes through an opening in the shelf 7 and onto the shelf 7. The opening in the shelf 7, through which the check strip passes, is the same opening through which the impression platen 8 moves. Fig. 2 also shows that the severing knife 180 is located between the end of the check chute 164 and the rear end of the horizontal section of the shelf 7.

A short statement giving the operations of the feeler fingers 11 and 70 will now be given. When a check is issued from the strip 160, (Fig. 2), it is fed into position on the shelf 7 and between the printing platen 8 and type elements. When the platen 8 is raised to make an impression, the knife blade 180 is also raised, and therefore, the ticket is severed from the strip 160 at the time the impression is taken. During this time the ticket overlies the finger 70, but the feeler finger 70 cannot function with the check at this time because the depression of the key 4 has locked the key 5 against depression, through the agency of a detent bar 55 (Figs. 5 and 12) having slots 56 for the reception of the pins 62 and 76 on the keys 4 and 5. Depression of either key, by moving the detent bar 55, locks out the other key. After the impression has been made and the ticket has been severed, the platen is lowered and the ejector roller 190 is raised and operated to feed the severed check toward the front of the machine on the shelf 7, so that it lies above the feeler finger 11 and away from the finger 70.

Thus, upon subsequent operation of the machine with the ticket still on the shelf 7, the finger 70 can rise to prevent the slip key 5 from being moved into functioning position and the feeler finger 11 is held in its depressed position, thus locking out the key 4.

When it is desired to place a slip on the shelf or receptacle 7 the manually operable lever 90 is first depressed to lower the feeler finger 11 and the slip is placed on the shelf 7 above both the feeler fingers 11 and 70. The slip thus maintains both the feeler fingers 11 and 70 in their depressed positions, and when in such positions, the key 4 is locked against depression, but the holding of the finger 70 depressed prevents the arm 73 from rising, and therefore, the slip key 5 can be depressed. Thus, when a slip is on the table the cash take key 4 is locked against depression and the slip key 5 can be depressed to release the machine.

From the foregoing description it can be seen that means are provided for preventing the closing of the cash drawer whenever a ticket is left remaining on the shelf, and that this means serves the function of reminding the salesperson that the ticket should be removed and delivered to the customer, together with the change. Again, it can be seen that wrong manipulation of the keys 4 and 5 is prevented as key 5 can only be depressed when a delivery bill or ticket is inserted, and key 4 can only be depressed when the cash take sale recording ticket is removed.

While the mechanism interposed between the printing attachment and the cash drawer lock is here more or less specifically illustrated, it is to be understood that any mechanism capable of being actuated by the ticket may be employed; similarly any mechanism capable of being controlled by a ticket, may be interposed between the keys 4 and 5 and the printing mechanism. It is also to be understood that various changes in form and proportion may be resorted to within the scope of the appended claims, similarly that the materials and finish of the several parts employed may be such as the experience and judgment of the manufacturer may dictate or varying uses may demand.

Referring to Figs. 2 and 3, a lever 90 is shown. This lever is pivotally supported on the pin 9 and is adapted to swing about said pin or pivot independently of the feeler lever 10; similarly lever 10 normally swings about the pivot independently of the lever 90. The lever 90 is manually operated whenever employed and it merely serves the purpose of transmitting a rocking movement to the lever 10 to depress the feeler finger 11 when a sales slip or ticket is to be inserted. The lever 90 has a handle extension 91 on its forward end. On the opposite end of the lever 90 is formed a lip 92 adapted to contact the rear side of the feeler lever 10, below the fulcrum point or pin 9. Therefore, when it is desired to insert a sales slip or ticket, it is only necessary to lift upwardly on the lever 90. The lip 92 will then contact the rear side of the lever 10 at a point below the fulcrum pin 9 and will therefore transmit a rocking or swinging movement to the same which will cause depression of the feeler finger 11 to such an extent that the sales slip may be inserted.

Having thus described my invention, what I claim and desire to secure by Letters Patent is—

1. In a cash register of the character described, a shelf cooperating with a printing mechanism, said shelf being provided for the reception of tickets printed by the printing mechanism, a lever pivotally mounted below the shelf, a finger on said lever projecting through a slot formed in the shelf, said finger adapted to be held depressed when a ticket is on the shelf, a cash drawer in the register, a latch pivotally attached to the cash drawer, a locking bar with which said latch is engageable, and means including a loose or slip connection intermediate the finger lever and the pivoted latch, and actuated by the finger and the lever to which it is attached to prevent engagement of the latch with the locking bar when the finger assumes a depressed position.

2. In a cash register of the character described, a shelf cooperating with a printing mechanism, said shelf being provided for the reception of tickets printed by the printing mechanism, a feeler lever pivotally mounted below the shelf, a finger on said feeler lever projecting through a slot formed in the shelf, said finger adapted to be held depressed when a ticket is on the shelf, a cash drawer in the register, a latch pivotally mounted on the cash drawer, a locking bar with which the latch is engageable when the drawer is closed, a cam face on the inner end of the latch, a latch-disabling lever pivotally mounted adjacent the latch, the lower end of said latch-disabling lever adapted to be swung into and out of engagement with the cam face on the latch, and means for locking said latch-disabling lever in a predetermined position where it will prevent engagement of the latch with the locking bar, said means being actuated by the feeler lever and the finger formed thereon.

3. In a cash register of the character described, a shelf cooperating with a printing mechanism, said shelf being provided for the reception of tickets printed by the printing mechanism, a lever pivotally mounted below the shelf, a finger on said lever projecting through a slot formed in the shelf, said finger adapted to be held depressed when a ticket is on the shelf, a cash drawer in the register, a latch pivotally mounted on the cash drawer, a locking bar with which the latch is engageable when the drawer is closed, a cam face on the inner end of the latch, a lever pivotally mounted adjacent the latch, the lower end of said lever adapted to be swung into and out of engagement with the cam face on the latch, a turnably mounted shaft, a latch on the shaft adapted to be raised or lowered with relation to the last named lever, a crank arm on the shaft and a link connection between said crank arm and the first named lever for imparting a turning movement to the shaft so as to raise and permit lowering of the last named latch.

4. In a cash register of the character described, a shelf cooperating with a printing mechanism, said shelf being provided for the reception of tickets printed by the printing mechanism, a lever pivotally mounted below the shelf, a finger on said lever and normally projecting through a slot formed in the shelf into the path of insertable record material, said finger adapted to be held depressed when a ticket is on the shelf, a cash drawer in the register, a latch pivotally mounted on the cash drawer, a locking bar with which the latch is engageable when the drawer is closed, a cam face on the inner end of the latch, a lever pivotally mounted adjacent the latch, the lower end of said lever adapted to be swung into and out of engagement with the cam face on the latch, a turnably mounted shaft, a latch on the shaft adapted to be raised or lowered with relation to the last named lever, a crank arm on the shaft, a link connection between said crank arm and the first named lever for imparting a turning movement to the shaft so as to raise and permit lowering of the last named latch, and manually operable means for imparting a rocking movement to the first named lever to withdraw the finger from the path of the insertable record material to enable the operator to insert the same on the shelf in position to receive an impression from said printing mechanism.

5. In a cash register of the character described, a printing mechanism, a plurality of independently depressible keys adapted to control the printing mechanism, a shelf for the reception of sales slips printed by the printing mechanism, and means controlled by the presence of a sales slip on the shelf to prevent depression of more than one key during a single operation.

6. In a cash register of the character described, a printing mechanism, a cash payment indicating key, a delivery indicating key, both of said keys being independently depressible and both controlling the printing mechanism, a shelf for the reception of slips adapted to be printed by the printing mechanism, and means controlled by the presence of a slip on the shelf to prevent depression of one of said keys.

7. In a cash register of the character described, a printing mechanism, a cash payment indicating key, a delivery indicating key, both of said keys being independently depressible and both controlling the printing mechanism, a shelf disposed below the printing mechanism adapted to receive tickets indicating cash sales and tickets of a different size indicating delivery sales, means operable normally and during the presence of a cash sale ticket to prevent depression of the delivery indicating key, and means controlled by the presence of a delivery ticket to prevent depression of the cash indicating key.

8. In a printing mechanism involving means for printing and issuing a check; a key for setting type appropriate thereto, means adapted to be controlled by a check in its issued position for locking said key against operation, a receptacle to receive an insertible slip, a normally ineffective key appropriate to said slip, and means adapted to be controlled by an insertible slip in printing position for rendering said key effective.

9. In a printing mechanism including a platen having a laterally projecting member, said mechanism being adapted to print a check and to issue it into a position from which it may be removed, a normally operative key for setting up type appropriate to said check, and means operated by said member and adapted to be held in operated position by an issued check for locking said key against operation.

10. The combination of a printing mechanism and a key for adjusting a type element included in said printing mechanism, and means movable into position to lock out said key upon partial depression of said key in the absence of a printing medium positioned in cooperative relation with said type element.

11. The combination of a printing mechanism adapted to print and issue a check and also to print on an inserted slip, keys corresponding to said check and slip, a table on which said check and slip are left after a printing operation, a feeler adapted to co-operate with said check and slip, and means controlled by the feeler to prevent a functioning depression of said key check when a slip only is left on the table and when a check only is left on the table.

12. The combination of a printing mechanism adapted to issue a check and to print on an inserted slip, a receptacle to receive an issued check or an inserted slip, keys corresponding to said check and slip, means controllable by the check and the slip when either is on the receptacle, to lock out one key, and means normally operable and in the presence of a check for locking out the other key but controllable by an inserted slip to enable the operation of the last-named key.

13. The combination of a printing mechanism adapted to print on an inserted slip and to move said slip from an inserted position to another position after an impression is taken, a plurality of keys, means controlled by said slip in either position for locking out one key, and means controlled by said slip in the inserted position to enable the other key to be depressed.

14. In a printing mechanism adapted to print and issue a check; a receptacle to support a slip, different in size from that of the check, in position to receive an impression from said printing mechanism; a type appropriate to said slip; manipulative means to adjust said type, but normally immovable into functioning position; a projection on said manipulative means; a device cooperating with the projection to maintain the manipulative means out of functioning position; and means adapted to be controlled by such a slip to hold said device out of cooperative relation with said projection, to enable the manipulative means to be moved into its functioning position.

15. In a printing mechanism, including a plurality of printing characters appropriate to a plurality of manipulative keys; means to render one of the keys ineffective; means adapted to be controlled by a slip of a certain size to lock out one of said keys; and means associated with the first-named means and adapted to be controlled by a different sized slip to render the first-named means inoperative, to render said one key effective.

ABRAHAM BLOCK.